(12) United States Patent
Greige et al.

(10) Patent No.: US 12,042,736 B2
(45) Date of Patent: Jul. 23, 2024

(54) DETECTING HIGH-SKILLED ENTITIES IN LOW-LEVEL MATCHES IN ONLINE GAMES

(71) Applicant: Electronic Arts Inc., Redwood City, CA (US)

(72) Inventors: Laura Greige, Boston, MA (US); Fernando de Mesentier Silva, San Francisco, CA (US); Alexander Sulimanov, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/457,194

(22) Filed: Dec. 1, 2021

(65) Prior Publication Data

US 2023/0166193 A1     Jun. 1, 2023

(51) Int. Cl.
*A63F 13/798* (2014.01)
(52) U.S. Cl.
CPC .................................. *A63F 13/798* (2014.09)
(58) Field of Classification Search
None
See application file for complete search history.

(56) References Cited

U.S. PATENT DOCUMENTS

| | | | | |
|---|---|---|---|---|
| 6,641,481 B1* | 11/2003 | Mai | .................. | A63F 13/795 463/29 |
| 10,207,191 B2* | 2/2019 | Jensen | .................. | A63F 13/335 |
| 2006/0258463 A1* | 11/2006 | Cugno | .................. | A63F 13/35 463/42 |
| 2007/0087799 A1* | 4/2007 | Van Luchene | ........ | A63F 13/847 463/1 |
| 2007/0112706 A1* | 5/2007 | Herbrich | ............. | G07F 17/3274 706/21 |
| 2007/0265063 A1* | 11/2007 | McNally | ................. | A63F 13/12 463/23 |
| 2008/0086534 A1* | 4/2008 | Bardak | ............... | G07F 17/3295 709/206 |
| 2008/0242420 A1* | 10/2008 | Graepel | ................. | A63F 13/12 463/42 |
| 2008/0242421 A1* | 10/2008 | Geisner | ................ | A63F 13/792 463/42 |
| 2009/0049542 A1* | 2/2009 | DeYonker | ............... | G06F 21/10 463/7 |
| 2009/0054123 A1* | 2/2009 | Mityagin | ................ | A63F 13/23 463/9 |
| 2010/0056275 A1* | 3/2010 | Wilson | .................... | A63F 13/12 463/43 |
| 2011/0092282 A1* | 4/2011 | Gary | ...................... | A63F 13/87 463/31 |

(Continued)

*Primary Examiner* — Tramar Harper
(74) *Attorney, Agent, or Firm* — Lee & Hayes, P.C.

(57) ABSTRACT

A high-skilled-low-level detection system may detect high-skilled entities in low-level matches of an online gaming. The system may identify a plurality of entities that are within a first category of entities eligible to be matched by a matchmaking algorithm. The system may then determine respective feature sets based at least in part on gameplay data associated with the plurality of entities and perform anomaly detection on the respective feature sets. The system may then determine, based on the anomaly detection, an anomalous entity of the plurality of entities and cause the matchmaking algorithm to match the anomalous entity with other entities that are in a second category of entities.

20 Claims, 5 Drawing Sheets

(56) References Cited

U.S. PATENT DOCUMENTS

| | | | | |
|---|---|---|---|---|
| 2013/0116044 | A1* | 5/2013 | Schwartz | A63F 13/12 463/29 |
| 2013/0274020 | A1* | 10/2013 | Novotny | A63F 13/792 463/42 |
| 2014/0066191 | A1* | 3/2014 | Yang | A63F 13/46 463/29 |
| 2014/0274404 | A1* | 9/2014 | Hoskins | A63F 13/335 463/42 |
| 2015/0105153 | A1* | 4/2015 | Xu | A63F 13/798 463/31 |
| 2016/0332073 | A1* | 11/2016 | Marr | A63F 13/46 |
| 2017/0333795 | A1* | 11/2017 | Hardee | A63F 13/35 |
| 2018/0185759 | A1* | 7/2018 | Torres | A63F 13/795 |
| 2019/0270021 | A1* | 9/2019 | Hume | A63F 13/87 |
| 2020/0086218 | A1* | 3/2020 | Nakano | A63F 13/58 |
| 2021/0138350 | A1* | 5/2021 | Teng | G06N 5/04 |

\* cited by examiner

DETECTING HIGH-SKILLED ENTITIES IN LOW-LEVEL MATCHES IN ONLINE GAMES

BACKGROUND

Online gaming allows for players to play a variety of electronic and/or video games with each other via network connectivity, such as via the Internet. Frustration may arise when competing with other players that have unfair advantages. For example, new, casual or low-skilled players may experience frustration when matched against high-skilled players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
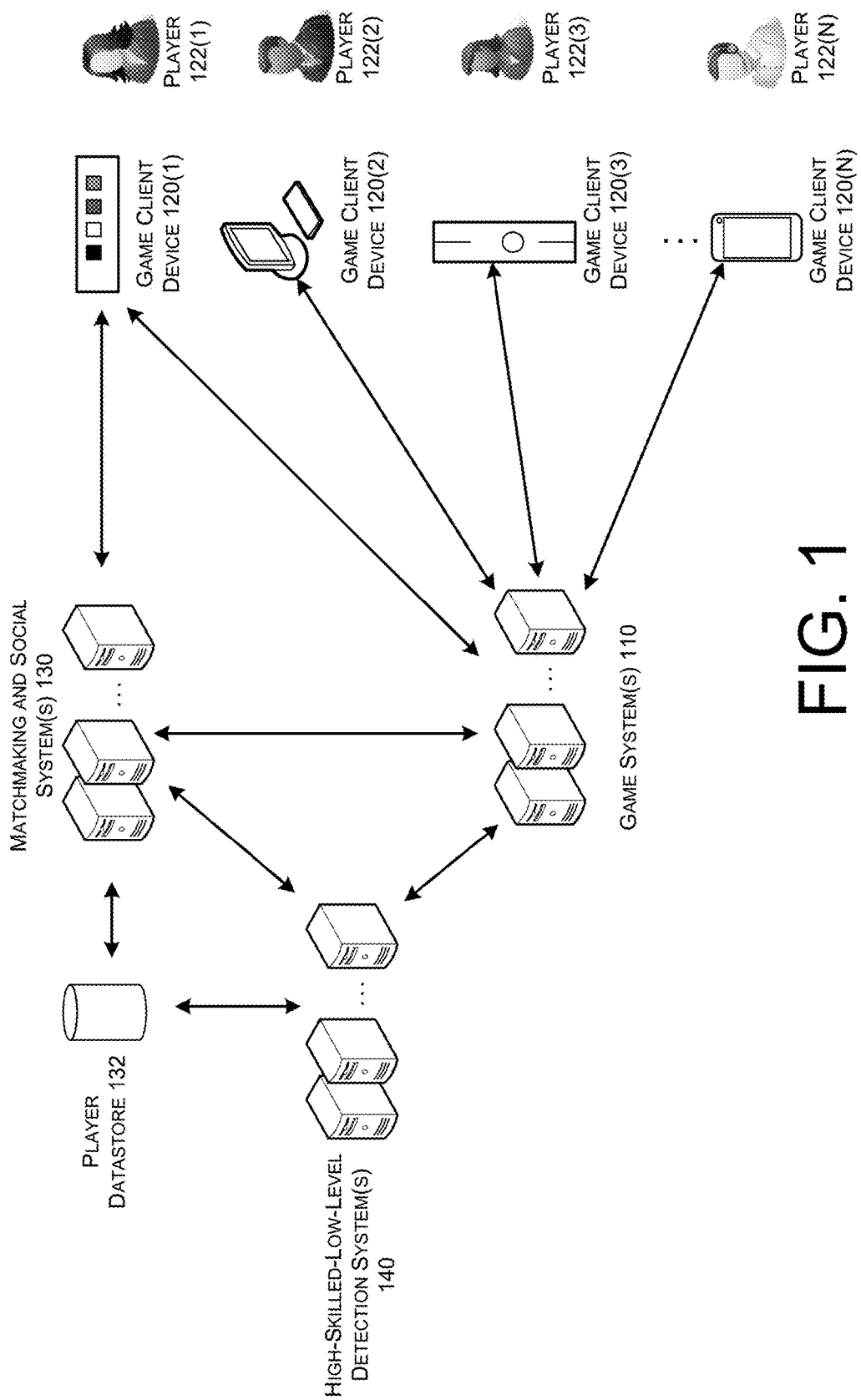
FIG. 1 illustrates a schematic diagram of an example environment with gaming system(s) and high-skilled-low-level detection system(s) to enable online gaming with high-skilled-low-level detection, in accordance with example implementations of the disclosure.

Example implementations of this disclosure describe methods, apparatuses, computer-readable media, and system(s) for detecting high-skilled entities in low-level matches in online gaming. For example, an online game may include multiple entities, such as players or teams of players, where each entity is intended to compete against the other entities. Online gaming platforms may include matchmaking systems that match the entities for instances of the online game (also referred to herein as matches). An entity that is intended to compete against other(s) may attain an unfair advantage by being matched against other entit(ies) with lower skill.

For example, an online game may include four players that are intended to compete as opponents on two teams. If one player is a high-skilled player and the other three players are new, casual or low-skilled players, the high-skilled player may dominate the gameplay causing frustration for the opposing team and the high-skilled player's own teammate. For example, the opposing team may be new players and learning a new game while subjected to a significant skill mismatch may significantly increase the time required to improve and/or learn the new game. The high-skilled player's teammate may feel superfluous or become bored due to a lack of opportunity to contribute or a lack of challenge. These issues may increase frustration and, generally, such frustration may drive the new or low-skilled players to abandon the game entirely.

To increase fairness and enjoyment of gameplay, matchmaking systems may consider the skill of the entities (e.g., via skill scores or similar scores) in a matchmaking algorithm to determine matchups. In some examples, the online game system may determine skill scores or similar scores (hereinafter, skill scores) based on gameplay of the players. A skill score may be a persistent, semi-persistent, or temporary value associated with an entity (e.g., a player, a team of players, etc.). In some examples, a skill score may be an indication of skill of the respective entity in a video game. Skill scores can be presented or reflected in game in a number of ways, including, but not limited to, a score, a rank, a category, or other in-game indication of the like.

However, the matchmaking system may lack information on which to assign an individualized skill score to new players (e.g., for new accounts or new usernames). As such, the matchmaking system may assign an initial skill score to new accounts or usernames (hereinafter accounts). Additionally or alternatively, the matchmaking system may perform matchmaking within tiers or ranges of skill scores. In such cases, the matchmaking system may include a new player tier for matching new players during an initial gameplay period.

A high-skilled player may play on a new account to cause the matchmaking system to match the high-skilled player against new, casual or low-skilled players. In another example, a high-skilled player may intentionally lose or otherwise play badly on an account to cause the matchmaking system to assign the account an artificially low skill score. This may result in the matchmaking system matching the high-skilled player against casual or low-skilled players (hereinafter low-skilled players).

In some examples, a high-skilled-low-level detection system according to this disclosure may determine that one or more entities in a new player tier or in a tier for low-skilled players is a high-skilled player. Upon detection of such a high-skilled player, the high-skilled-low-level detection system may cause the matchmaking algorithm to match the high-skilled player with other players that are in a tier other than the new player tier. For example, the high-skilled-low-level detection system may cause the high-skilled player to be moved into a higher tier for matchmaking. In some examples, the movement of the high-skilled player into the higher tier may bypass, accelerate, or otherwise override the primary skill score determination process (e.g., the matchmaking scoring algorithm) used by the online game system in determining skill scores. While examples herein are not limited to any particular primary skill score determination process, some examples may include a primary skill score determination process that constrains the increase or decrease of a player's skill score. Such constraints, in the case of a player who has been correctly skill scored, may avoid an outsized impact of an unusual period (e.g., a bad day or a lucky streak) on the player's skill score that may otherwise push the player into a lower tier or higher tier that would be unsuitable for the player's usual performance level. Another constraint in the primary skill score determination process may quarantine new players in the new player tier for a period (e.g., a number of games, a number of kills, a period of time, etc.). Such a constraint may provide new players a safe period in which to learn the game without being matched with experienced players. However, these constraints may also prolong the time period in which high-skilled players may remain in a new player or low skill tier. Example high-skilled-low-level detection systems according to this disclosure may complement the primary skill score determination process by, for example, rapidly moving the high-skilled player into a higher tier without making the primary skill score determination process overly sensitive or reactive.

As described in further detailed below, the systems and methods described herein are presented for exemplary and illustrative purposes; they are not indicative of applicant's product or implementation plans. Moreover, it should be understood that any reference herein to the use of player or user data would be in compliance with privacy policies that respect players' privacy, and in accordance with player privacy settings or preferences.

The systems and methods disclosed herein may analyze gameplay, behavioral and/or other data to detect high-skilled players in low-skill or low-level matches. In some examples, the analyzed player data may include gameplay data, extra-gameplay behavioral data, extrinsic data and/or other data that may relate to early gameplay data of the players. In this context, early gameplay player data for a player may be player data from a period beginning at account creation through some threshold, such as the first ten matches or the first five hours of gameplay.

Using players' gameplay, behavioral and/or other data, systems and methods according to this disclosure may generate a feature set of metrics to differentiate high-skilled-low-level players from new players and/or low-skilled players.

Gameplay data may be based on player's actions and interactions during game play (e.g., kill data, character or class choices, item choices, accuracy, damage dealt, ranking, etc.). The analysis of gameplay data may generate gameplay and/or match metrics (hereinafter referred to as gameplay metrics) such as kill metrics (e.g., number of matches to reach 100 kills, average kills per match, kills per death ratio, etc.), gameplay statistics metrics (e.g., average rank placement, accuracy, attack placement, damage caused and/or taken, etc.), and/or player choice metrics (e.g., class or character choices, weapon or item choices, spawn location choices, etc.).

Analysis of other data may include extrinsic or external data (hereinafter extrinsic data) such as the player's IP address or the game device the player is using, as well as social interactions or connections (e.g., in-game chat, lobby chat or other game platform or system chat; gaming platform or system enabled direct messaging; friends list; guild, group or community messaging; guild, group, or community membership; etc.). In an example, the analysis of extrinsic data may determine whether the player's IP address or game device are also associated with a different account (e.g., a different account that is associated with a high-skilled player). In another example, the analysis may determine a new player has connections with two other players with high skill scores that are not themselves related. Such metrics may indicate the player associated with the new account is an experienced player.

Analysis of other data may also include extra-gameplay behavior data. In an example, extra-gameplay behavior data may include whether the player has spent real world money on the new account (e.g., for cosmetic unlocks or items).

High-skilled players that are playing a new account for an unfair advantage are unlikely to expend real world money on the alternative account as the high-skilled players may be likely to abandon the alterative account once the new account's skill score is high enough to result in fair matchmaking or once the new account's new player safe period has elapsed. Instead, the high-skilled players may save such funds for their primary or main account. In another example, extra-gameplay behavior data may include behavior related to game functions outside of the core gameplay. In this context, core gameplay may refer to the functions of the game or actions of the player directly bearing on matches or instances of the online game such as in-match actions, player setup (e.g., class or character choices, weapon or item choices, spawn location choices, etc.), and so on. Game functions outside of the core gameplay may be similar or related to core gameplay such as training levels or tutorials but do not directly impact the matches or instances of the online game. In an example, extra-gameplay behavior data may include information relating to actions of the player during training or tutorials, such as whether the player utilized an exploit or flaw to bypass part of all of a normally unskippable tutorial.

Once generated, the feature set may be input to an anomaly detection algorithm that may output anomalies (e.g., which may be suspected high-skilled-low-level players). Anomalies may be feature sets that are inconsistent with the distribution of the majority of feature sets. For example, an anomaly may be described as an observation which deviates so much from the other observations as to arouse suspicions that it was generated by a different mechanism.

Upon detection, high-skilled-low-level players may be moved into a higher tier and/or disqualified from rewards or incentives meant for or restricted to new players. However, actions are not limited to these examples. For example, where terms of service limit players to a single account, a high-skilled-low-level player's new account may be suspended, banned and so on. Similar consequences may be applied to the high-skilled-low-level player's primary account. Such actions may be automatic or taken following a human or algorithmic review of the output of the anomaly detection algorithm. Such a review may include an investigation to manually surface additional information for making a final high-skilled-low-level determination.

The high-skilled-low-level detection system may also mark detected high-skilled-low-level players for additional observation or analysis after an action is performed. For example, the high-skilled-low-level detection system may flag the player for continued data collection and for a follow-up analysis for of the player's gameplay performance in the player's new tier. In such a case, the change in matchup tier may be performed while also preserving the player's pre-detection skill score (e.g., by applying a modifier to the skill score for matchmaking purpose during a period following the detection). After the period, an analysis may be performed to determine whether the player's performance in the new tier is within expectations. If so, the player's skill score may be permanently changed to match the new tier (e.g., subject to further modification by the primary skill score determination process). If the player performance in the period following the change in tier is not within expectations (e.g., the player's performance is unreasonably poor), the high-skilled-low-level detection system may reduce or remove the modifier to the player's skill score. For example, where the matchmaking system performs matches in a new player tier, a low-skilled tier, a medium-skilled tier, and a high-skilled tier, the high-skilled-low-level detection system may place detected high-skilled-low-level players into the medium skilled tier. Where the player is determined to have underperformed in the first five or ten matches in the medium skilled tier, the high-skilled-low-level detection system may return the detected player to the new player tier or change the modifier to place the detected player in the low-skilled tier. Depending on the example, further observation or analysis may or may not be performed.

Certain implementations and implementations of the disclosure will now be described more fully below with reference to the accompanying figures, in which various aspects are shown. However, the various aspects may be implemented in many different forms and should not be construed as limited to the implementations set forth herein. For example, some examples provided herein relate to fighting or shooting games (e.g., battle royale games). Implementations are not limited to the example genres. It will be appreciated that the disclosure encompasses variations of the implementations, as described herein. For example, while the discussion herein focuses on players as high-skilled-low-level entities, implementations may perform similar functions for other entities such as teams of players. In a particular example, teams of players may be matched rather than individual players and teams may have associated skill scores. In a similar way to players, the teams may have a new team tier or may be assigned an initial team skill score. High-skilled-low-level detection systems according to this disclosure may detect anomalously skilled low-level teams (e.g., an experienced team operating on alternative accounts to obtain an unfair advantage or an incentive being offered for new teams). In another variation, the high-skilled-low-level detection system discussed herein may be applied to all tiers of the matchmaking system. For example, feature sets may be generated for all players in all tiers and then input to an anomaly detector to detect players performing anomalously for their assigned skill score. Such systems may address issues arising from players intentionally underperforming to artificially lower their skill scores to obtain matches against easier opponents. Many other variations are within the scope of this disclosure. Like numbers may refer to like elements throughout.

FIG. 1 illustrates a schematic diagram of an example environment 100 with game system(s) 110, game client device(s) 120, matchmaking and social system(s) 130, a player datastore 132, and high-skilled-low-level detection system(s) 140 that may enable online gaming with high-skilled-low-level detection, in accordance with example implementations of the disclosure.

The example environment 100 may include one or more player(s) 122(1), 122(2), 122(3), . . . 124(N), hereinafter referred to individually or collectively as player(s) 122, who may interact with respective game client device(s) 120(1), 120(2), 120(3), . . . 120(N), hereinafter referred to individually or collectively as game client device(s) 120 via respective input device(s).

The game client device(s) 120 may receive game state information from the one or more game system(s) 110 that may host the online game played by the player(s) 122 of environment 100. The game state information may be received repeatedly and/or continuously and/or as events of the online game transpire. The game state information may be based at least in part on the interactions that each of the player(s) 122 have in response to events of the online game hosted by the game system(s) 110.

The game client device(s) 120 may be configured to render content associated with the online game to respective player(s) 122 based at least on the game state information. More particularly, the game client device(s) 120 may use the most recent game state information to render current events of the online game as content. This content may include video, audio, haptic, combinations thereof, or the like content components.

As events transpire in the online game, the game system(s) 110 may update game state information and send that game state information to the game client device(s) 120. For example, if the player(s) 122 are playing an online soccer game, and the player 122 playing one of the goalies moves in a particular direction, then that movement and/or goalie location may be represented in the game state information that may be sent to each of the game client device(s) 120 for rendering the event of the goalie moving in the particular direction. In this way, the content of the online game is repeatedly updated throughout game play.

When the game client device(s) 120 receive the game state information from the game system(s) 110, a game client device 120 may render updated content associated with the online game to its respective player 122. This updated content may embody events that may have transpired since the previous state of the game (e.g., the movement of the goalie).

The game client device(s) 120 may accept input from respective player(s) 122 via respective input device(s). The input from the player(s) 122 may be responsive to events in the online game. For example, in an online basketball game, if a player 122 sees an event in the rendered content, such as an opposing team's guard blocking the point, the player 122 may use his/her input device to try to shoot a three-pointer. The intended action by the player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system(s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

The game system(s) 110 may receive inputs from various player(s) 122 and update the state of the online game based thereon. As the state of the online game is updated, the state may be sent to the game client device(s) 120 for rendering online game content to player(s) 122. In this way, the game system(s) 110 may host the online game.

The example environment 100 may further include matchmaking and social system(s) 130, hereinafter matchmaking system(s) 130 to match player(s) 122 who wish to play the same game and/or game mode with each other and to provide a platform for communication between the player(s) 122 playing online games (e.g., the same game and/or different games). The matchmaking system(s) 130 may receive an indication from the game system(s) 110 of player(s) 122 who wish to play an online game.

The matchmaking system(s) 130 may attempt matchmaking between player(s) 122. The matchmaking system(s) 130 may access information about the player(s) 122 who wish to play a particular online game, such as from a player datastore. A user account for each of the player(s) 122 may associate various information about the respective player(s) 122 and may be stored in the player datastore 132 and accessed by the matchmaking system(s) 130.

Players(s) 122 may be matched according to one or more metrics associated with the player(s) 122 such as skill at a particular game. In addition to or alternatively to skill scores, player(s) 122 may be matched on a variety of other factors. Some example matchmaking factors may be related to behavior in addition to skill and may include a player's playstyle. For example, when matching player(s) 122 as a team for a team deathmatch, the matchmaking system(s) 130 may favor matching player(s) 122 that exhibit similar levels of aggression or a mix of levels of aggression. This may alleviate the frustration experienced by players when deathmatch teams split up due to different players utilizing different tactics. Splitting a deathmatch team into different groups using different tactics can often result in a loss to an opposing team operating as a single unit with a shared tactical approach. The aspects of players' playstyle utilized for different genres or different individual games may vary from example to example.

Some other example matchmaking factors may be character or setup related such as character class, team choice, position or role preference, and so on. For example, when matching player(s) 122 for an online roleplaying game, the matchmaking system(s) 130 may consider the character classes of the player(s) 122. Other matchmaking factors may be related to teammates or teams of the player(s) 122. In an example, the matchmaking may match a player 122 to other players the player 122 plays with regularly.

Having matched the player(s) 122, the matchmaking system(s) 130 may instruct generation of instance(s) of the online game(s) for the match(es). More particularly, the matchmaking system(s) 130 may request the game system(s) 110 instantiate an online game between the matched player(s) 122. For example, the matchmaking system(s) 130 may provide connection information for the game client device(s) 120 to the game system(s) 110 for instantiation of an instance of the online game between the matched player(s) 122. As discussed herein, instances and matches of an online game may be used interchangeably and may refer to a shared gameplay environment in which matched players play in the online game, whether a single map, multiple connected maps, or a gameplay world. In some examples, a server may host the match or instance of the game for the matched players.

As a player 122 engages in additional gameplay, the gaming system(s) 110 may provide the matchmaking system(s) 130 with some or all of the game state information. The matchmaking system(s) 130 may store the game state information or data derived from the game state information in the player datastore 132. In this manner, behavior data and/or gameplay history for the player 122 may remain up-to-date, even if or as the player's behaviors and playstyle evolve over time.

The matchmaking system may determine and/or update skill scores based at least in part on the behavior data and/or gameplay history of the players 122. Such operations may be referred to herein as the primary skill score determination process or a matchmaking scoring algorithm. In some examples, the primary skill score determination processes may be configured or based in part on a player skill determination algorithm, such as, for example, a Bayesian based algorithm. Examples online gaming systems according to this disclosure are not limited to particular primary skill score determination processes and other suitable primary skill score determination processes would be apparent to one of ordinary skill in the art based on this disclosure.

As mentioned above, the matchmaking system(s) 130 may further provide a platform for communication between the player(s) 122 playing online games (e.g., the same game and/or different games). Depending on the implementation, the matchmaking system(s) 130 may provide a social platform in which player(s) 122 may utilize friends list, communities and/or groups, and other connections to establish relationships with other player(s) 122. The matchmaking system(s) 130 may also provide direct messaging, group messaging, public messaging, chat, and/or other communications functionality to allow player(s) 122 to communicate via the social platform. Communications may be considered in-game when exchanged in the context of, or within the executable of a particular game. Communications may be considered external or extra-game when exchanged in a multi-game context (e.g., on a social platform provided by a game distribution system associated with a library of games), in contexts unrelated to the gaming system, and so on. For example, the matchmaking system(s) 130 and game system(s) 110 may be portions of a game distribution system which may provide a social platform that is not tied to a particular game. Instead, the game distribution system may provide for obtaining and playing many games. Relationships created in such an external or extra-game context may or may not be segregated from relationships created using an in-game social function. For example, the extra-game relationships formed on the game distribution system providing the game may be imported to or otherwise duplicated into the in-game social function or may be ignored and players may need to manually reform the relationships in-game if desired.

In addition, the matchmaking system(s) 130 (or the game system(s) 110) may include in-match communications functionality that may allow player(s) 122 to communicate with other player(s) 122 while in matches or instances of the online game.

In some examples, information regarding the players' 122 social relationships and/or social interactions and/or communications, whether in-match, in-game, or external, may be captured by matchmaking system(s) 130, the game system(s) 110 or another system and stored in the player datastore 132 (e.g., for use in high-skilled-low-level detection). The level of detail and/or which types of social information is captured and stored in the player datastore 132 may vary.

In some examples, the high-skilled-low-level detection system(s) 140 may determine that one or more entities (e.g., players, teams, groups of players, etc.) are high-skilled but being matched as low-skilled or low-level entities based at least in part on gameplay data, extra-gameplay behavior data, extrinsic data and/or other data. The high-skill-low-level detection system(s) 140 may retrieve gameplay data, extra-gameplay behavior data, extrinsic data and/or other data from the player datastore 132, the game system(s) 110, the game client device(s) 120, the matchmaking system(s) 130, and/or external system(s) (e.g., third party systems and/or external systems such as an external social media system).

The high-skilled-low-level detection system(s) 140 may generate feature sets for the entities and input the feature sets into an anomaly detector to detect entities which are likely or suspected of being high-skilled-low-level entities. Additional details regarding the creation of a feature set for use in detecting collusion is provided below with respect to FIG. 2.

As mentioned above, while examples herein are not limited to any particular primary skill score determination process, some examples may include a primary skill score determination process that constrains the increase or decrease of a player's skill score. Such constraints, in the case of a player who has been correctly skill scored, may avoid an outsized impact of an unusual period (e.g., a bad day or a lucky streak) on the player's skill score that may otherwise push the player into a lower tier or higher tier that would be unsuitable for the player's usual performance level. Another constraint in the primary skill score determination process may quarantine new players in the new player tier for a period (e.g., a number of games, a number of kills, a period of time, etc.). Such a constraint may provide new players with a safe period in which to learn the game without being matched with experienced players. However, these constraints may also prolong the time period in which high-skilled players may remain in a new player or low-skill tier. The high-skilled-low-level detection system 140 may complement the primary skill score determination process by, for example, rapidly moving the high-skilled player into a higher tier without making the primary skill score determination process overly sensitive or reactive.

For example, the high-skilled-low-level detection system(s) 140 may flag likely or suspected anomalous entities to the matchmaking system(s) 130 and/or game system(s) 110 for resolution or review. For example, the high-skilled-low-level detection system(s) 140 may flag the entities to a human reviewer associated with the game system(s) 110. The human reviewer may utilize administrative power to monitor the entities in future matches or may investigate past interactions and gameplay to determine whether actions should be taken with regard to the flagged entities (e.g., whether or not the primary skill score determination process should be overridden for the flagged entities such that the flagged entities are matched against higher skilled opponents). Additionally or alternatively, the high-skilled-low-level detection system(s) 140 may cause actions to be taken automatically with regard to detected entities once the entities are flagged as anomalous.

The high-skilled-low-level detection system 140 may also mark detected high-skilled-low-level players for additional observation or analysis after an action is performed. For example, the high-skilled-low-level detection system may flag the player for continued data collection and follow up analysis for gameplay in the player's new tier. In such a case, the change in matchup tier may be performed while also preserving the player's pre-detection skill score (e.g., by applying a modifier to the skill score for matchmaking purpose during a period following the detection). After the period, an analysis may be performed to determine whether the player's performance in the new tier is within expectations. If so, the player's skill score may be permanently changed to match the new tier (e.g., subject to further modification by the primary skill score determination process). If the player performance in the period following the change in tier is not within expectations (e.g., the player's performance is unreasonably poor), the high-skilled-low-level detection system may reduce or remove the modifier to the player's skill score. For example, where the matchmaking system performs matches in a new player tier, a low-skilled tier, a medium skilled tier, and a high-skilled tier, the high-skilled-low-level detection system may place detected high-skilled-low-level players into the medium skilled tier. Where the player is determined to have underperformed in the first five or ten matches in the medium skilled tier, the high-skilled-low-level detection system may return the detected player to the new player tier or change the modifier to place the detected player in the low-skilled tier. Depending on the example, further observation or analysis may or may not be performed.

Figure 2:
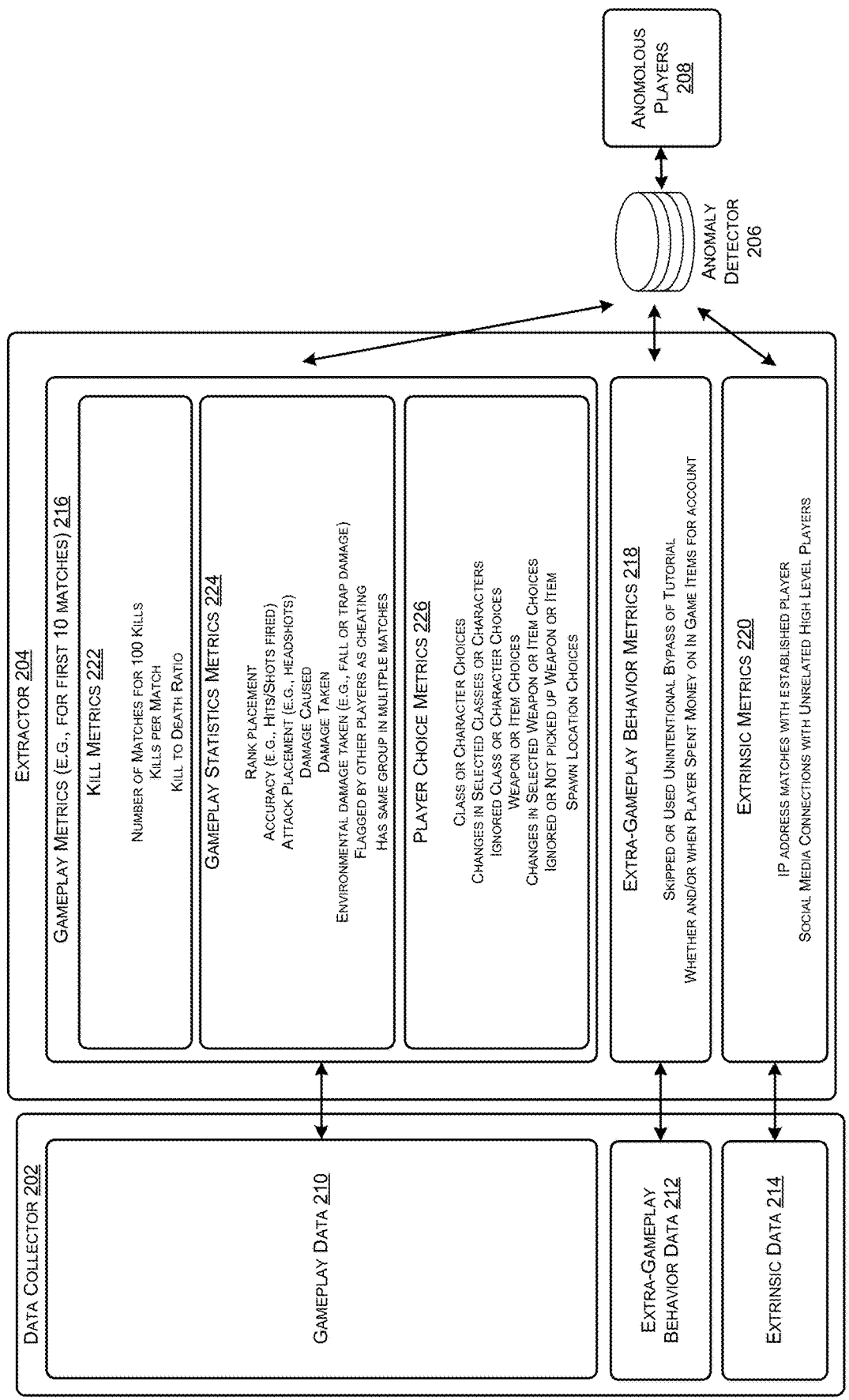
FIG. 2 illustrates a block diagram of an example high-skilled-low-level detection system(s) that may detect high-skilled entities with low levels, low skill scores, or who are otherwise being matched against lower-level or lower-skill entities (e.g., new players) in an online game, in accordance with example implementations of the disclosure.

FIG. 2 illustrates an example block diagram 200 of example high-skilled-low-level detection system(s) that may detect high-skilled entities with low levels, low skill scores, or who are otherwise being matched against lower-level or lower-skill entities (e.g., new players) in an online game, in accordance with example implementations of the disclosure. The example high-skilled-low-level detection system(s) may include a data collector 202, an extractor 204, and an anomaly detector 206. The example high-skilled-low-level detection system(s) 200 may operate to output anomalous player data 208 that may identify entities (e.g., players) suspected of being high-skilled entities with low levels, low skill scores, or who are otherwise being matched against lower-level or lower-skill entities. The illustrated high-skilled-low-level detection system of FIG. 2 may be an example implementation of the high-skilled-low-level detection system(s) 140. While the example illustrated in FIG. 2 relates to detection of high-skilled players in new player matches or a new player tier, implementations are not so limited and may also be applied to other entities (e.g., teams of multiple players) and/or detecting anomalously skilled entities within various categories (e.g., detecting players competing in a low-skill or casual tier despite performing at a substantially higher skill level due to having artificially low skill scores).

In operation, the data collector 202 of the high-skilled-low-level detection system(s) 140 may collect gameplay data 210, extra-gameplay behavior data 212 and/or extrinsic data 214 for players participating or who participated in matches of the online game. As mentioned above, data 210-214 may be collected from one or more of the player datastore 132, the game system(s) 110, the game client device(s) 120, the matchmaking system(s) 130, and/or external system(s). In some examples, when detecting high-skilled players that are being matched with new players, the data collector 202 may operate to collect data 210-214 during early gameplay for new player accounts. In this context, early gameplay player data for a player may be player data from a period beginning at account creation through some threshold, such as the first ten matches or the first five hours of gameplay.

The gameplay data 210 may be based on player's actions and interactions during game play (e.g., kill data, character or class choices, item choices, accuracy, damage dealt, ranking, etc.). The gameplay data 210 may include information for a period of gameplay or a number of matches (e.g., ten matches, ten hours, etc.).

The extra-gameplay behavior data 212 may include data regarding how much real world money the player has spent on the new account (e.g., for cosmetic unlocks or items), data regarding behavior related to game functions outside of the core gameplay such as data about the player's actions within or relating to a tutorial, and so on.

The extrinsic data 214 may include data such as the player's IP address, an identifier of the game device the player is using, social interactions or connections of the player with other players, and so on.

Once the data collector 202 has collected data 210-214, the extractor 204 may process the collected data to generate data for each of the entities currently being analyzed (e.g., each player, teams or so on). The extractor 204 may generate data for a variety of metrics. In the illustrated example of FIG. 2, the extractor 204 may generate gameplay metrics 216, extra-gameplay behavior metrics 218, and extrinsic metrics 220. Additional detail regarding the metrics 216-220 is provided below. However, the metrics discussed herein are merely examples, not limiting, and one of ordinary skill in the art would be aware of other metrics and/or types of metrics which could be utilized in view of this disclosure. Further, categories, types or classifications for data and/or metrics are merely for example and discussion purpose.

The gameplay metrics 216 may be generated based at least on the gameplay data 210 and may include kill metrics 222, gameplay statistics metrics 224, and player choice metrics 226.

The kill metrics 222 may relate to kills, points scored or victories by the player in question. Some example metrics that may be generated for use in anomaly detection may include the number of matches the player played to accumulate 100 kills, the player's average kills per round, the player's minimum and/or maximum kills in a round, and the player's kill to death ratio. For example, the number of matches a player played after account creation before reaching 100 kills may be significant for detecting high-skilled players in a new player tier because the learning curve being experienced by new players is not experienced by high-skilled players (e.g., meaning that high-skilled players will likely reach 100 kills in far fewer matches in comparison to the average new player).

The gameplay statistics metrics 224 may relate to gameplay statistics other than kill metrics 222. Some example gameplay statistics metrics 224 include the player's rank placement in matches or game instances (e.g., average rank; median rank; number of matches the player had top rank; number of matches the player placed in the top 3, top 5, or top 10; etc.), the player's accuracy (e.g., hits to shots fired ratio, median number of consecutive hits before missing, etc.), the player's attack placement (e.g., percentage of hits or shots resulting in headshots, ratio of weak point hits to armored area hits, ratio of first hits on weak point hits to first hits on armored areas, etc.), the damage caused by the player (e.g., average per match, average per enemy engaged, etc.), the damage taken by the player (e.g., average per match, average per enemy engaged, etc.), the amount of environmental damage taken or caused by the player (e.g., how much fall damage or trap damage the player accumulated during the considered matches, the average fall damage or trap damage the player took per round, how much environmental damage the player caused opposing player to take during the considered matches, etc.), whether the player was flagged by other players as a suspected cheater, and whether the player maintained the same group over multiple matches, and so on. For example, environmental damage taken by new players (e.g., due to falls or traps) is likely to be higher than that taken by high-skilled players and high-skilled players will be more likely to cause opposing players to take environmental damage in comparison to new players (e.g., by shooting exploding barrels near opposing players or by using weapons or skills to push opposing players off cliffs or into hazards, etc.). In another example, while new players may form bonds with other new players and play multiple matches together in a group, high-skilled players playing new accounts may outwardly appear to do so at an anomalously higher rate. In some cases, the high-skilled player may form and maintain more groups or teams because their higher skill may cause actual new players to desire such a team up. In other cases, the high-skilled player may form and maintain more groups or teams because a group of friends that are all high-skilled players may have created new accounts to play in the new player tier together.

The player choice metrics 226 may relate to in game or in match choices by players. In many games, experience and/or skill may lead to particular choices being made by most or all high-skilled players while new players may make other choices due to a lack of experience or knowledge or as part of the experimenting and/or learning process of new players. Some example player choice metrics 226 include the player's choice of classes or characters to play, changes in the player's selected classes or characters (e.g., the number of times the player changed in the considered time period or the average number of matches per change), which classes or characters where ignored or avoided by the player, the player's choice of weapons or items, changes in the player's selected weapon or items, which weapons or items were ignored or avoided (e.g., not selected, not picked up, or picked up but rapidly discarded), and what spawn locations the player chose or avoided. In an example, some weapons or classes may be known as subpar by high-skilled players. As such, while new players will use such weapons until they have enough experience, high-skilled players will be unlikely to ever pick up subpar weapons and will likely drop the any subpar weapons as soon as another option is available. Similarly, high-skilled players may know certain weapons or classes, which initially appear subpar, excel when used in an unexpected or unconventional manner. As such, while new players will avoid what appears on first inspection to be a poor choice, high-skilled players will choice the weapon or class and likely immediately begin using the weapon or class in the unexpected or unconventional manner.

The above examples of gameplay metrics are not exhaustive and other examples would be apparent in view of this disclosure.

The extra-gameplay behavior metrics 218 may, for example, relate to player behaviors or choices which may be outside the core gameplay of the online game. Extra-gameplay behavior metrics may be generated based on extra-gameplay behavior data 212. Extra-gameplay behavior metrics 218 may include metrics related to whether the player has spent any or a threshold amount of real world money on the new account (e.g., for cosmetic unlocks or items), behavior related to game functions outside of the core gameplay, and so on. Regarding whether the player has spent any or a threshold amount of money on the new account, a high-skilled player playing on a new account as an alternative to an existing primary account for the purpose of being matched to new players is likely to abandon the new account once the account leaves the new player tier. As such, high-skilled players may spend less on such alternative accounts than actual new players. As mentioned, the extra-gameplay behavior metrics 218 may include metrics related to a variety of extra-gameplay behaviors and such metrics will vary from game to game. In the example shown in FIG. 2, an example extra-gameplay behavior metric relates to the player's actions within or relating to a tutorial. High-skilled players may be more likely than actual new players to skip any tutorial when creating an alternative account and high-skilled players who habitually create new accounts to play against new players may develop or discover alternative ways to complete unskippable tutorials (e.g., by exploits or workarounds). For example, high-skilled players may discover that by after starting the tutorial, the tutorial may complete on its own with no player inputs (e.g., there is no fail condition and the tutorial sequence advances on a timer). In such a case, some high-skilled players may start the tutorial and do something else while the tutorial autocompletes. Other players may determine sections of the tutorial can be bypassed. The extra-gameplay behavior metrics 218 may include metrics that indicate whether the player used one or more of these approaches.

The extrinsic metrics 220 may include metrics related to information about the player that is unrelated to or superficially related to the online game. The extrinsic metrics 220 may be generated based on the extrinsic data 214. Extrinsic metrics 220 may include metrics related to whether the player's IP address matches an IP address associated with an pre-existing account and metrics related to whether the player has social connections or social interactions with multiple other high-skilled players that are not themselves related by social interaction, gameplay or social media connections. For example, while many new players may have a friend who already plays the game, new players may be less likely to interact with or have social media connections to multiple fully established and unrelated players in higher tiers. At the same time, high-skilled players may be more likely to have two or more sets of players that the high-skilled player plays with, but which do not interact or have connections (e.g., other than through the high-skilled player).

The metrics discussed herein are merely examples and the many additional or alterative metrics may be utilized by the high-skilled-low-level detection system 140. For example, developers or administrators of online games would be able to determine metrics appropriate for the particular online games in view of this disclosure.

The gameplay metrics 216, the extra-gameplay behavior metrics 218, and the extrinsic metrics 220 may be input as a feature set to the anomaly detector 206. The anomaly detector 206 may perform anomaly detection on the feature set to determine players whose metrics 216-220 were anomalous and, by extension, who are suspected of being high-skilled-low-level players. In an example, the anomaly detector 206 may utilize an isolation forest algorithm for anomaly detection. Isolation forest is a tree ensemble method. Such anomaly detection may build an ensemble of decision trees which may then be used to find outliers in the data (e.g., anomalies). Each decision tree may be built on a process of finding a way to partition the data based on a feature dimension. For example, a feature may be selected to split the data. Then, a value at which to split the selected feature may be selected. This process may be repeated to form the decision tree (e.g., where each feature split may further divide the data). An isolation forest algorithm may then analyze the group of decision trees and determine data points that can be identified with a small number of splits (e.g., meaning the data points were quickly separated from the rest of the data points, indicating they are anomalous). Implementations are not limited to a particular anomaly detection algorithm, as other anomaly detection algorithms may be utilized.

In some examples, the anomaly detector 206 may be configured to adapt or evolve as new feature sets are input. In such examples, a feature set that was anomalous may become non-anomalous and vice versa over time as the online game changes or evolves. For example, online games may change due to one or more updates, the start of a new season, the release of an expansion, and so on. Such changes may change the behaviors of the players and make anomalous behavior into non-anomalous behavior and vice versa. For example, each new season of an online game may introduce changes that affect the power of existing classes, characters, items, weapons, abilities, and so on. New seasons may also introduce new classes, characters, items, weapons, abilities, and the like. Each season, high-skilled players may determine particular builds or setups in the online game which are the most powerful (e.g., sometimes referred to as the current meta). For example, such a build may include a playable character of the game, a set of skills, abilities or powers of that character, and an accompanying item and weapon loadout. Similarly, the high-skilled players may determine the least desirable characters, classes and/or items of the new season and avoid or ignore those. As mentioned above, new players are less likely, especially in early gameplay, to be aware of the current desirable and undesirable builds. As such, an anomaly detector will likely detect players who focus on the current desirable builds and avoids the current undesirable builds as anomalous. However, with a new season, the anomaly detection may evolve or adapt as high-skilled players are no longer focused on last season's desirable builds.

The anomaly detector 206 may output anomalous player data 208 regarding the anomalous players' feature sets. For example, the anomaly detector 206 may output the feature sets for the anomalous players as well as the data 210-214 and metrics 216-220 regarding the suspected high-skilled-low-level players to a human reviewer for investigation and further action, if warranted. Such action may include moving the high-skilled-low-level player into a higher matchmaking tier but other actions may also be taken (e.g., banning, suspension, forfeiture of in-game awards or standing, and so on). For example, the human reviewer may utilize administrative power to monitor the entities in future matches or may investigate past interactions and gameplay to determine whether actions should be taken with regard to the flagged entities (e.g., whether or not the primary skill score determination process should be overridden for the flagged entities such that the flagged entities are matched against higher skilled opponents). Additionally or alternatively, the high-skilled-low-level detection system(s) may take action automatically with regard to detected entities once the entities are flagged as anomalous.

Many variations are possible. For example, the above discussion of FIG. 2 primarily relates to high-skilled individuals that are competing against new or low-skilled individuals. The anomaly described with regard to FIG. 2 is not limited to individuals. Rather, feature sets may be prepared with regard to teams or other groupings (e.g., where teams are established and ranked in a seasonal tournament). Additionally, the above-described feature sets are merely exemplary and many variations and alternatives will be apparent to one of ordinary skill in the art in view of this disclosure.

Figure 3:
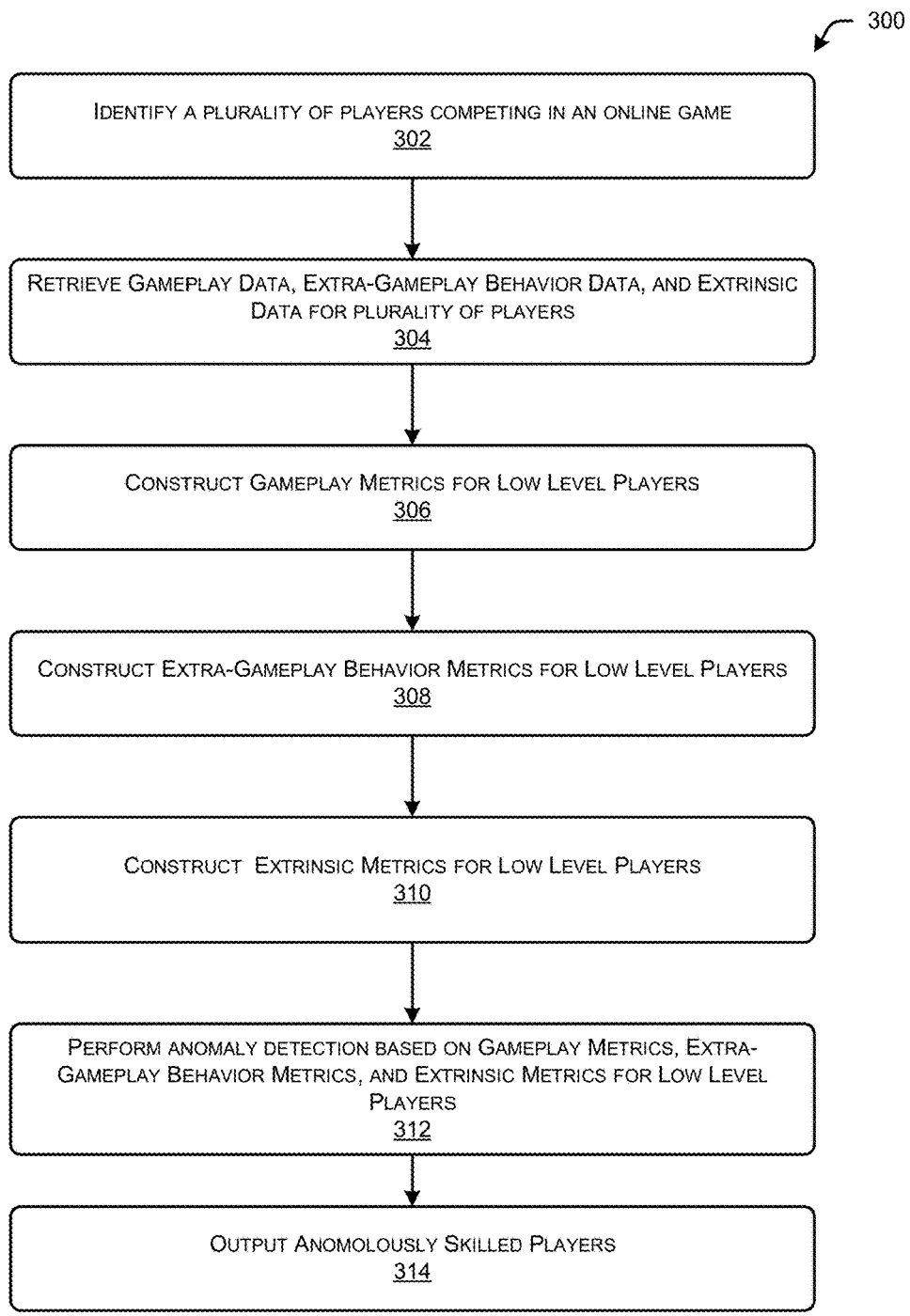
FIG. 3 illustrates a flow diagram of an example method that may determine that one or more entities (e.g., players, teams, groups of players, etc.) are high-skilled but being matched as low-skilled or low-level entities in an online game, in accordance with example implementations of the disclosure.

FIG. 3 illustrates a flow diagram of an example method 300 that may determine that one or more entities (e.g., players, teams, groups of players, etc.) are high-skilled but being matched as low-skilled or low-level entities in an online game, in accordance with example implementations of the disclosure. The method 300 may be performed by the high-skilled-low-level detection system(s) 140, individually or in cooperation with one or more other elements of the environment 100.

At block 302, the high-skilled-low-level detection system(s) 140 may identify a plurality of players competing in an online game. The high-skilled-low-level detection system(s) 140 may then retrieve gameplay data, extra-gameplay behavior data, and extrinsic data for the plurality of players of the online game at block 304.

At 306, the high-skilled-low-level detection system(s) 140 may construct gameplay metrics of a feature set for each of the low-level players as discussed above with regard to FIG. 2. Similarly, at block 308, the high-skilled-low-level detection system(s) 140 may construct extra-gameplay behavior metrics of a feature set for each of the low-level players as discussed above with regard to FIG. 2. Then, at block 310, the high-skilled-low-level detection system(s) 140 may construct extrinsic metrics of a feature set for each of the low-level players as discussed above with regard to FIG. 2.

The high-skilled-low-level detection system(s) 140 may perform anomaly detection based on the gameplay metrics, extra-gameplay behavior metrics, extrinsic metrics of the feature sets of the low-level players at block 312. Then, the high-skilled-low-level detection system(s) 140 may output one or more anomalously skilled players (e.g., players that are likely high-skilled players being matched against new or low-skilled players) at block 314.

Figure 4:
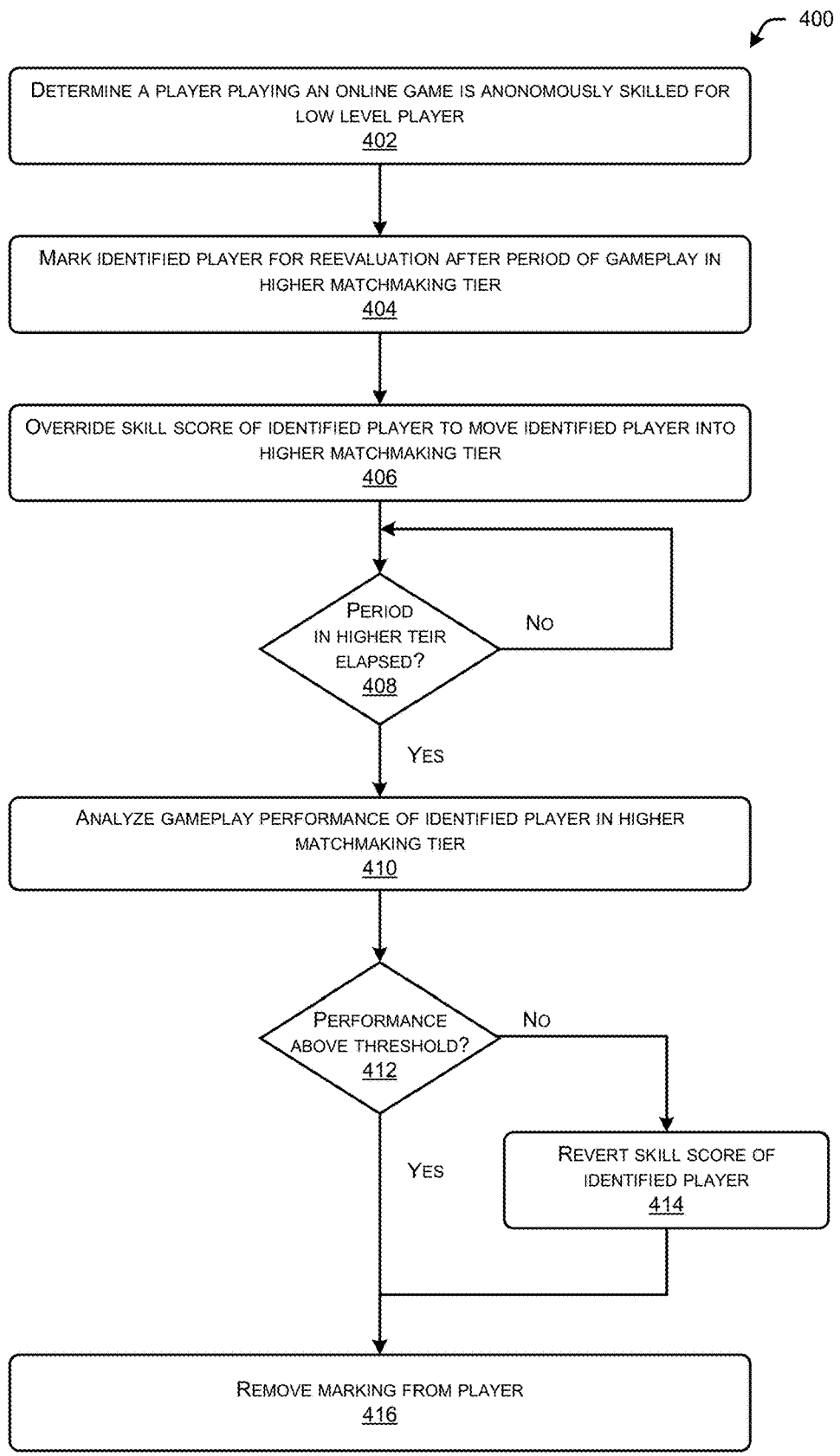
FIG. 4 illustrates a flow diagram of an example method that may automatically take action with respect to a player of an online game that is identified as high-skilled but that is being matched as a low-skilled or low-level player, in accordance with example implementations of the disclosure.

FIG. 4 illustrates a flow diagram of an example method 400 that may automatically take action with respect to a player of an online game that is identified as high-skilled but that is being matched as a low-skilled or low-level player, in accordance with example implementations of the disclosure. The method 400 may be performed by the high-skilled-low-level detection system(s) 140, individually or in cooperation with one or more other elements of the environment 100.

At block 402, the high-skilled-low-level detection system(s) 140 may determine a player playing an online game is anomalously skilled for a low-level player of the online game (e.g., as discussed above with respect to FIGS. 1-3). The high-skilled-low-level detection system(s) 140 may mark the identified player for reevaluation after a period of gameplay in a higher matchmaking tier at block 404. The high-skilled-low-level detection system(s) 140 may also store the current skill score of the identified player. The high-skilled-low-level detection system(s) 140 may then override the current skill score of the identified player to move the identified player into the higher matchmaking tier at block 406.

At block 408, the high-skilled-low-level detection system(s) 140 may determine whether the reevaluation period has elapsed. If so, the process may continue to 410. Otherwise, the high-skilled-low-level detection system(s) 140 may continue waiting at 408.

At 410, the high-skilled-low-level detection system(s) 140 may analyze the gameplay performance of the identified player for gameplay in the higher matchmaking tier. Then, at block 412, the high-skilled-low-level detection system(s) 140 determine whether the gameplay performance of the identified player in the higher matchmaking tier was above a threshold level. If so, the process may continue to 416. If not, the process may continue to 414 where the high-skilled-low-level detection system(s) 140 may revert or modify the skill score of the identified player before continuing to 416. At block 416, the high-skilled-low-level detection system(s) 140 may remove the reevaluation marking from the identified player.

It should be noted that some of the operations of methods 300 and 400 may be performed out of the order presented, with additional elements, and/or without some elements. Some of the operations of methods 300 and 400 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 5:
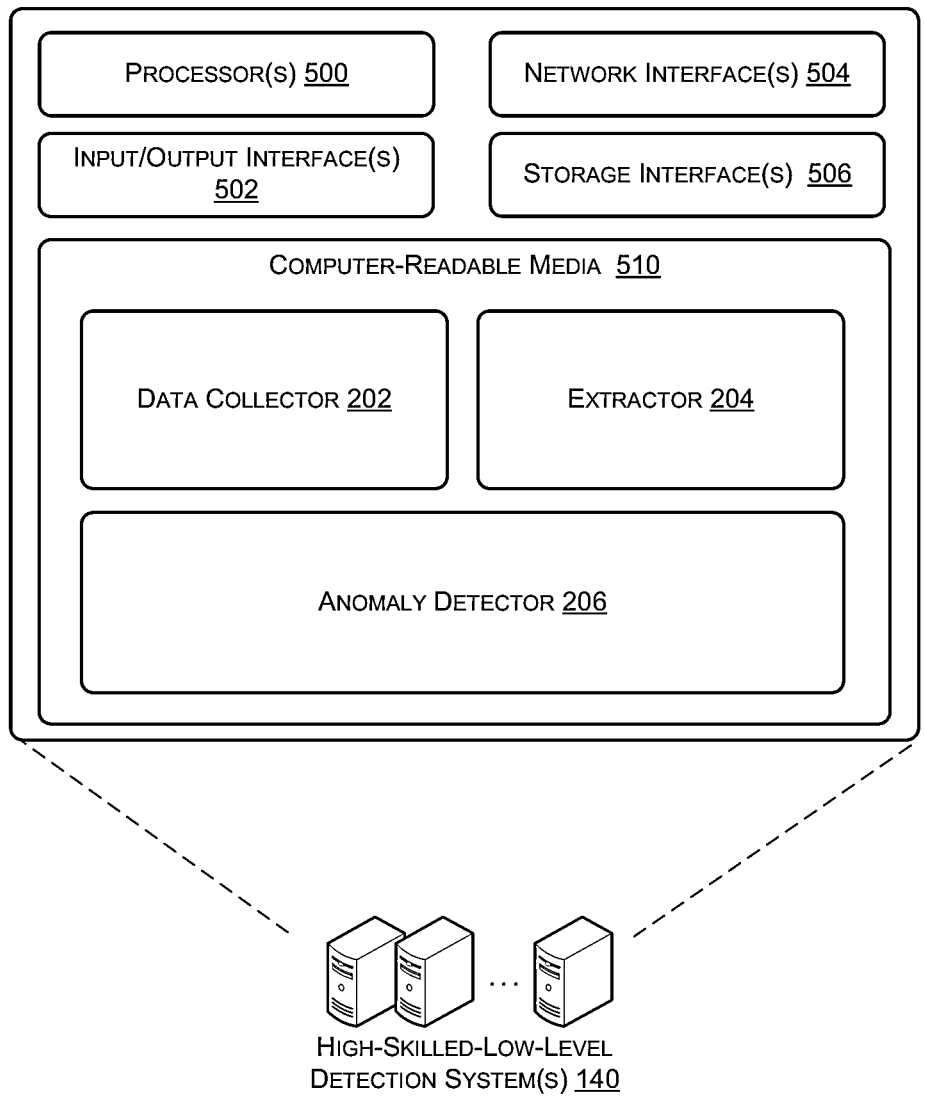
FIG. 5 illustrates a block diagram of example high-skilled-low-level detection system(s) that may provide high-skilled-low-level detection for online games, in accordance with example implementations of the disclosure.

FIG. 5 illustrates a block diagram of example high-skilled-low-level detection system(s) 140 that may provide high-skilled-low-level detection for online games, in accordance with example implementations of the disclosure. The high-skilled-low-level detection system(s) 140 may include one or more processor(s) 500, one or more input/output (I/O) interface(s) 502, one or more network interface(s) 504, one or more storage interface(s) 506, and computer-readable media 510.

In some implementations, the processors(s) 500 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), etc. Additionally, each of the processor(s) 500 may possess its own local memory, which also may store program modules, program data, and/or one or more operating system(s). The one or more processor(s) 500 may include one or more cores.

The one or more input/output (I/O) interface(s) 502 may enable the high-skilled-low-level detection system(s) 140 to detect interaction with a user and/or other system(s), such as one or more game system(s) 110. The I/O interface(s) 502 may include a combination of hardware, software, and/or firmware and may include software drivers for enabling the operation of any variety of I/O device(s) integrated on the high-skilled-low-level detection system(s) 140 or with which the high-skilled-low-level detection system(s) 140 interacts, such as displays, microphones, speakers, cameras, switches, and any other variety of sensors, or the like.

The network interface(s) 504 may enable the high-skilled-low-level detection system(s) 140 to communicate via the one or more network(s). The network interface(s) 504 may include a combination of hardware, software, and/or firmware and may include software drivers for enabling any variety of protocol-based communications, and any variety of wireline and/or wireless ports/antennas. For example, the network interface(s) 504 may comprise one or more of a cellular radio, a wireless (e.g., IEEE 802.1x-based) interface, a Bluetooth® interface, and the like. In some implementations, the network interface(s) 504 may include radio frequency (RF) circuitry that allows the high-skilled-low-level detection system(s) 140 to transition between various standards. The network interface(s) 504 may further enable the high-skilled-low-level detection system(s) 140 to communicate over circuit-switch domains and/or packet-switch domains.

The storage interface(s) 506 may enable the processor(s) 500 to interface and exchange data with the computer-readable medium 510, as well as any storage device(s) external to the high-skilled-low-level detection system(s) 140, such as the player datastore 132.

The computer-readable media 510 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 510 may be implemented as computer-readable storage media (CRSM), which may be any available physical media accessible by the processor(s) 500 to execute instructions stored on the computer readable media 510. In one basic implementation, CRSM may include RAM and Flash memory. In other implementations, CRSM may include, but is not limited to, ROM, EEPROM, or any other tangible medium which can be used to store the desired information and which can be accessed by the processor(s) 500. The computer-readable media 510 may have an operating system (OS) and/or a variety of suitable applications stored thereon. The OS, when executed by the processor(s) 500 may enable management of hardware and/or software resources of the high-skilled-low-level detection system(s) 140.

Several functional blocks having instruction, data stores, and so forth may be stored within the computer-readable media 510 and configured to execute on the processor(s) 500. The computer readable media 510 may have stored thereon the data collector 202, the extractor 204, and the anomaly detector 206. It will be appreciated that each of the functional blocks 202-206 may have instructions stored therein that, when executed by the processor(s) 500, may enable various functions pertaining to the operations of the high-skilled-low-level detection system(s) 140.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example implementations of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, implementations of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other implementations, the databases shown can be integrated or distributed into any number of databases or other data storage devices.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to:
determine, based on first gameplay data associated with a first plurality of entities associated with respective computing devices participating in an online game, respective matchmaking scores based on a scoring algorithm;
identify, based on the respective matchmaking scores, a second plurality of entities of the first plurality of entities that are within a first category of entities eligible to be matched into an instance of the online game by a matchmaking algorithm, wherein the second plurality of entities are identified by the matchmaking algorithm based at least in part on the respective matchmaking scores;
determine second gameplay data associated with the second plurality of entities;
determine, for at least two entities of the second plurality of entities, respective feature sets based at least in part on the second gameplay data associated with the second plurality of entities;
perform anomaly detection on the respective feature sets, wherein the anomaly detection is separate from the scoring algorithm;
determine, based on the anomaly detection, an anomalous entity of the at least two entities of the second plurality of entities; and
cause the matchmaking algorithm to match the anomalous entity with other entities in a second category of entities.

2. The system of claim 1, wherein:
causing the matchmaking algorithm to match the anomalous entity with the other entities in the second category of entities includes replacing a matchmaking score of the anomalous entity with a replacement matchmaking score.

3. The system of claim 2, wherein the computer-executable instructions further cause the one or more processors to:
capture additional gameplay data of the anomalous entity in gameplay with the other entities that are in the second category of entities,
determine, based on the additional gameplay data, a performance metric of the anomalous entity is below a performance threshold, wherein the performance metric is based on a performance of the anomalous entity in the gameplay with the other entities; and
based on determining the performance metric is below the performance threshold, cause the matchmaking algorithm to match the anomalous entity with the entities that are in the first category of entities.

4. The system of claim 1, wherein the first category of entities that are eligible to be matched into the instance of the online game by the matchmaking algorithm is a new player category.

5. The system of claim 4, wherein the second gameplay data associated with the second plurality of entities relates to respective gameplay of individual ones of the second plurality of entities during a threshold period after creation of respective accounts of the individual ones of the second plurality of entities.

6. The system of claim 1, wherein the respective feature sets include a metric associated with a number of instances of the online game that the at least two entities played to get a threshold number of kills.

7. The system of claim 1, wherein the respective feature sets include a metric associated with player choices including character or class choices.

8. A computer-implemented method comprising:
determining, based on first gameplay data associated with a first plurality of entities associated with respective computing devices participating in an online game, respective matchmaking scores based on a scoring algorithm;
identifying, based on the respective matchmaking scores, a second plurality of entities of the first plurality of entities that are within a first category of entities eligible to be matched into an instance of the online game by a matchmaking algorithm, wherein the second plurality of entities are identified by the matchmaking algorithm based at least in part on the respective matchmaking scores;
determining second gameplay data associated with the second plurality of entities;
determining, for at least two entities of the second plurality of entities, respective feature sets based at least in part on the second gameplay data associated with the second plurality of entities;
performing anomaly detection on the respective feature sets, wherein the anomaly detection is separate from the scoring algorithm;
determining, based on the anomaly detection, an anomalous entity of the at least two entities of the second plurality of entities; and
causing the matchmaking algorithm to match the anomalous entity with other entities in a second category of entities.

9. The computer-implemented method of claim 8, wherein causing the matchmaking algorithm to match the anomalous entity with the other entities in the second category of entities includes replacing a matchmaking score of the anomalous entity with a replacement matchmaking score.

10. The computer-implemented method of claim 9, further comprising:
capturing additional gameplay data of the anomalous entity in gameplay with the other entities that are in the second category of entities,
determining, based on the additional gameplay data, a performance metric of the anomalous entity is below a performance threshold, wherein the performance metric is based on a performance of the anomalous entity in the gameplay with the other entities; and
based on determining the performance metric is below the performance threshold, causing the matchmaking algorithm to match the anomalous entity with the entities that are in the first category of entities.

11. The computer-implemented method of claim 8, wherein the first category of entities that are eligible to be matched into the instance of the online game by the matchmaking algorithm is a new player category.

12. The computer-implemented method of claim 11, wherein the second gameplay data associated with the second plurality of entities relates to respective gameplay of individual ones of the second plurality of entities during a threshold period after creation of respective accounts of the individual ones of the second plurality of entities.

13. The computer-implemented method of claim 8, wherein the respective feature sets include a metric associated with a number of instances of the online game that the at least two entities played to get a threshold number of kills.

14. The computer-implemented method of claim 8, wherein the respective feature sets includes a metric associated with player choices including character or class choices.

15. One or more non-transitory computer-readable media storing computer-executable instructions that, when executed by one or more processors, cause the one or more processors to perform operations comprising:
 determining, based on first gameplay data associated with a first plurality of entities associated with respective computing devices participating in an online game, respective matchmaking scores based on a scoring algorithm;
 identifying, based on the respective matchmaking scores, a second plurality of entities of the first plurality of entities that are within a first category of entities eligible to be matched into an instance of the online game by a matchmaking algorithm, wherein the second plurality of entities are identified by the matchmaking algorithm based at least in part on respective matchmaking scores;
 determining second gameplay data associated with the second plurality of entities;
 determining, for at least two entities of the second plurality of entities, respective feature sets based at least in part on the second gameplay data associated with the second plurality of entities;
 performing anomaly detection on the respective feature sets, wherein the anomaly detection is separate from the scoring algorithm;
 determining, based on the anomaly detection, an anomalous entity of the at least two entities of the second plurality of entities; and
 causing the matchmaking algorithm to match the anomalous entity with other entities in a second category of entities.

16. The one or more non-transitory computer-readable media of claim 15, wherein causing the matchmaking algorithm to match the anomalous entity with the other entities in the second category of entities includes replacing a matchmaking score of the anomalous entity with a replacement matchmaking score.

17. The one or more non-transitory computer-readable media of claim 16, the operations further comprising:
 capturing additional gameplay data of the anomalous entity in gameplay with the other entities that are in the second category of entities,
 determining, based on the additional gameplay data, a performance metric of the anomalous entity is below a performance threshold, wherein the performance metric is based on a performance of the anomalous entity in the gameplay with the other entities; and
 based on determining the performance metric is below the performance threshold, causing the matchmaking algorithm to match the anomalous entity with the entities that are in the first category of entities.

18. The one or more non-transitory computer-readable media of claim 15, wherein the first category of entities that are eligible to be matched into the instance of the online game by the matchmaking algorithm is a new player category.

19. The one or more non-transitory computer-readable media of claim 18, wherein the second gameplay data associated with the second plurality of entities relates to respective gameplay of individual ones of the second plurality of entities during a threshold period after creation of respective accounts of the individual ones of the second plurality of entities.

20. The one or more non-transitory computer-readable media of claim 15, wherein the respective feature sets include a metric associated with a number of instances of the online game that the at least two entities played to get a threshold number of kills.

\* \* \* \* \*